W. J. MURPHY.
NUT LOCK.
APPLICATION FILED APR. 13, 1910.

971,775.

Patented Oct. 4, 1910.

Witnesses
Chas. L. Griesbauer.
E. M. Ricketts

Inventor
W. J. Murphy,
By Watson E. Coleman.
Attorney

UNITED STATES PATENT OFFICE.

WILLIAM J. MURPHY, OF PERRY, OKLAHOMA.

NUT-LOCK.

971,775.  Specification of Letters Patent.  Patented Oct. 4, 1910.

Application filed April 13, 1910. Serial No. 555,527.

*To all whom it may concern:*

Be it known that I, WILLIAM J. MURPHY a citizen of the United States, residing at Perry, in the county of Noble and State of Oklahoma, have invented certain new and useful Improvements in Nut-Locks, of which the following is a specification, reference being had to the accompanying drawings.

This invention relates to improvements in nut locks, and has for its object to provide a simple, inexpensive and efficient device of this character whereby the nut will be securely locked upon the bolt to obviate its accidental release.

A further object resides in the provision of a nut adapted for locking engagement upon the bolt, said nut being provided with lugs adapted to engage the threads of the bolt and bind thereupon.

Figure 1:
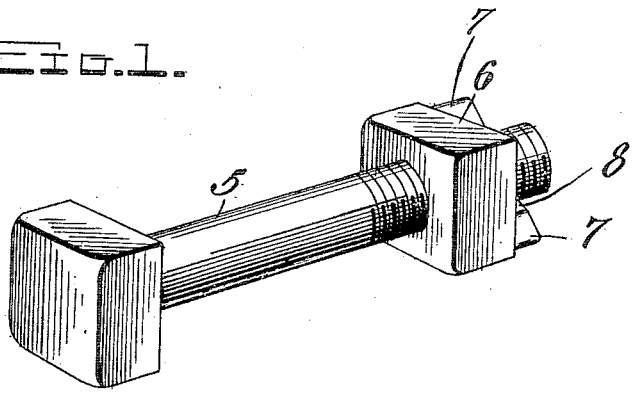
Figure 2:
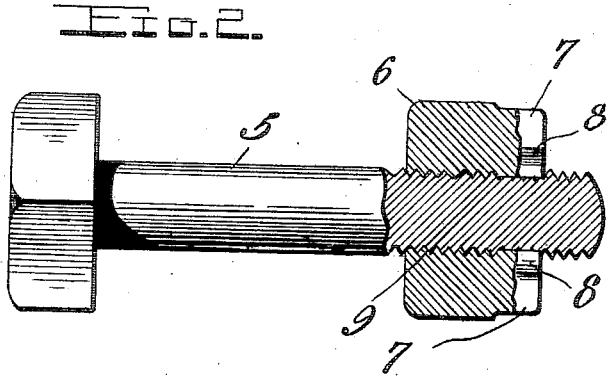
Figure 3:
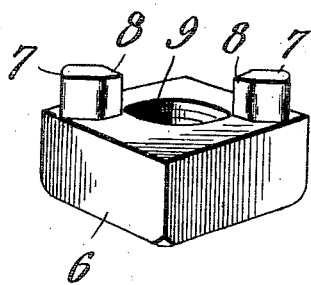

With these and other objects in view, the invention consists of the novel features of construction, combination and arrangement of parts hereinafter fully described and claimed and illustrated in the accompanying drawings, in which:

Figure 1 is a perspective view of a nut lock constructed in accordance with the present invention; Fig. 2 is a side elevation, the nut being shown in section; and Fig. 3 is a detail perspective view of the nut.

Referring more particularly to the drawings, 5 indicates a bolt upon which the nut 6 is threaded. This nut is of the ordinary form, and may be of any polygonal shape, and is provided at diametrically opposite points upon its outer face with the lugs 7. One of the longitudinal edges of each of the lugs is beveled or sharpened, as shown at 8, said sharpened edge being disposed at the edge of the bore of the nut 9 from which the bolt extends. These lugs are so positioned that the nut may be readily threaded upon the bolt and after being suitably arranged thereon, they are adapted to be struck with a wrench or hammer to securely engage the sharpened edges 8 of the threads of the bolt, binding or cutting into the same and effectually preventing any turning movement of the nut.

My improved nut lock is especially adapted for use in railway track construction, and efficiently secures the fish plates upon the ends of the adjacent rail sections, and obviates any possibility of the release of the nuts, and disconnection of the rail sections. The device is, however, as well adapted to a large number of other useful purposes, and may be variously modified without departing from the essential features or sacrificing any of the advantages of the invention. It is also extremely durable and may be manufactured at a very low cost, no change in the construction of the bolt being necessary. The lugs 7 would preferably be integrally formed or cast upon the nut and when it is desired to remove the nut from the bolt they may be struck with a wrench to disengage their sharpened edges upon the bolt threads, so that the nut may be readily turned.

Having described my invention, what I claim is:

1. In a nut lock, the combination with a bolt, of a nut threaded thereon, a lug formed on said nut adjacent to the bore thereof, said lug having a sharpened edge and adapted to be forced into engagement with the bolt threads to prevent turning of the nut.

2. In a nut lock, the combination with a bolt, of a nut threaded thereon, having lugs formed upon one face at diametrically opposite points and adjacent to the bore thereof, each of said lugs having a sharpened edge the longitudinal edges of said lugs being disposed in longitudinal alinement with the bolt, said lugs being adapted to be bent to force the sharpened edges thereof into binding engagement with the bolt threads to prevent turning movement of the nut.

3. In a nut lock, the combination with a bolt, of a nut threaded thereon having oppositely disposed rectangular lugs formed upon one of its faces, the opposed edges of said lugs being sharpened and disposed adjacent to the bore of the nut, said lugs being adapted to be bent to force the sharpened edges thereof inwardly upon the threads of the bolt to cut into the same, and prevent turning movement of the nut.

In testimony whereof I hereunto affix my signature in the presence of two witnesses.

WILLIAM J. MURPHY.

Witnesses:
 HORACE A. SMITH,
 G. J. CHAPLIN.